US012272374B2

(12) United States Patent
Barkai et al.

(10) Patent No.: US 12,272,374 B2
(45) **Date of Patent: *Apr. 8, 2025**

(54) QUANTIFYING SIGNAL PURITY BY MEANS OF MACHINE LEARNING

(71) Applicant: NUVOTON TECHNOLOGY CORPORATION, Hsin-chu (TW)

(72) Inventors: Ittai Barkai, Tel Aviv (IL); Itamar Tamir, Tel Aviv (IL)

(73) Assignee: Nuvoton Technology Corp., Hsinchu (TW)

( * ) Notice: Subject to any disclaimer, the term of this patent is extended or adjusted under 35 U.S.C. 154(b) by 177 days.

This patent is subject to a terminal disclaimer.

(21) Appl. No.: 17/938,986

(22) Filed: Sep. 7, 2022

(65) Prior Publication Data

US 2023/0136220 A1 May 4, 2023

Related U.S. Application Data

(63) Continuation-in-part of application No. 17/518,616, filed on Nov. 4, 2021, now Pat. No. 11,941,083.

(51) Int. Cl.
*G10L 25/51* (2013.01)
*G10L 25/30* (2013.01)

(52) U.S. Cl.
CPC .............. *G10L 25/51* (2013.01); *G10L 25/30* (2013.01)

(58) Field of Classification Search
CPC ................................ G10L 25/51; G10L 25/30
See application file for complete search history.

(56) References Cited

U.S. PATENT DOCUMENTS

| | | | | |
|---|---|---|---|---|
| 10,559,316 | B2 | 2/2020 | Cassidy et al. | |
| 11,322,167 | B2 * | 5/2022 | Healy | G10L 21/0232 |
| 11,574,628 | B1 * | 2/2023 | Kumatani | G06N 3/084 |
| 11,941,083 | B2 * | 3/2024 | Barkai | G06F 18/2148 |
| 2019/0287550 | A1 | 9/2019 | Lim | |

OTHER PUBLICATIONS

U.S. Appl. No. 17/518,616 Office Action dated Oct. 19, 2023.
Williams, "Measuring Total Harmonic Distortion (THD)," Technical Article, AAC—All About Circuits, pp. 1-8, Feb. 20, 2017, as uploaded from https://www.allaboutcircuits.com/technical-articles/the-importance-of-total-harmonic-distortion/.
Poudel et al., "Solar Power Prediction Using Deep Learning Technique," Advanced Science and Technology Letters, vol. 146 (FGCN 2017), pp. 148-151, year 2017.

* cited by examiner

*Primary Examiner* — Andrew Sniezek
(74) *Attorney, Agent, or Firm* — Meitar Patents Ltd.; Daniel Kligler

(57) ABSTRACT

A system includes a memory and a processor. The memory is configured to store a machine learning (ML) model. The processor is configured to (i) obtain a set of training audio signals in a form of a plurality of initial audio signals, which have first durations in a first range of durations and which are labeled with respective levels of distortion, (ii) train the ML model to estimate the levels of the distortion based on the training audio signals, (iii) receive an input audio signal having a duration in a second range of durations, shorter than the first durations, and (iv) estimate a level of the distortion in the input audio signal by applying the trained ML model to the input audio signal.

27 Claims, 9 Drawing Sheets

QUANTIFYING SIGNAL PURITY BY MEANS OF MACHINE LEARNING

CROSS-REFERENCE TO RELATED APPLICATIONS

The present application is a continuation-in-part of U.S. patent application Ser. No. 17/518,616, titled "Quantifying Signal Purity by means of Machine Learning," filed Nov. 4, 2021, whose disclosure is incorporated herein by reference.

FIELD OF THE INVENTION

The present invention relates generally to processing of audio signals, and particularly to methods and systems for quantification of audio signal purity.

BACKGROUND OF THE INVENTION

An audio system is typically regarded as "high quality" if the ratio between the input signal and the added audio artefacts, which are a by-product of the system itself, is kept to a minimum. Such artefacts can be divided into noise, non-harmonic distortion and harmonic distortion. Sensing and quantifying such artefacts is needed both for designing better systems and for providing real-time control of automatic-tuning systems.

Techniques for sensing of distortion in audio signals have been previously proposed in the patent literature. For example, U.S. Pat. No. 10,559,316 describes systems and methods that provide distortion sensing, prevention, and/or distortion-aware bass enhancement in audio systems, that can be implemented in a variety of applications. Sensing circuitry can generate statistics based on an input signal received for which an acoustic output is generated. In some embodiments, the sensing circuitry is operable to compute a soft indicator corresponding to a likelihood of distortion or a degree of objectionable, perceptible, or measurable distortion, at an output of the speaker using a technique selected from a group including machine learning, statistical learning, predictive learning, or artificial intelligence.

SUMMARY OF THE INVENTION

An embodiment of the present invention that is described hereinafter provides a system including a memory and a processor. The memory is configured to store a machine learning (ML) model. The processor is configured to (i) obtain a set of training audio signals in a form of a plurality of initial audio signals, which have first durations in a first range of durations and which are labeled with respective levels of distortion, (ii) train the ML model to estimate the levels of the distortion based on the training audio signals, (iii) receive an input audio signal having a duration in a second range of durations, shorter than the first durations, and (iv) estimate a level of the distortion in the input audio signal by applying the trained ML model to the input audio signal.

In some embodiments, the processor is further configured to normalize the initial audio signals and normalize the input audio signal.

In some embodiments, the processor is further configured to slice the initial audio signals into slices having the second durations in a second range of durations, shorter than the first durations.

In an embodiment, the distortion includes a Total Harmonic Distortion (THD).

In some embodiments, the ML model includes a convolutional neural network (CNN)

In an embodiment, the CNN classifies the distortion according to the levels of distortion that label the training audio signal.

In some embodiments, the CNN estimates the distortion using regression method.

In some embodiments, the ML model includes a recursive neural network (RNN).

In an embodiment, the RNN includes a long short term memory (LSTM) artificial neural network (ANN).

In another embodiment, the LSTM ANN estimates the level of distortion using one of classification and regression.

In an embodiment, wherein the RNN includes a Gater Recurrent Unit (GRU) ANN.

In another embodiment, the RNN includes a Transformer ANN, wherein the Transformer ANN estimates the level of distortion using one of classification and regression.

In some embodiments, the input audio signal is received from nonlinear audio processing circuitry.

In some embodiments, the processor is further configured to control, using the estimated level of the distortion, an audio system that produces the input audio signal.

There is additionally provided, in accordance with another embodiment of the present invention, a method including storing a machine learning (ML) model in a memory. A set of training audio signals is obtained in a form of a plurality of initial audio signals, which have first durations in a first range of durations and which are labeled with respective levels of distortion. The ML model is trained to estimate the levels of the distortion based on the training audio signals. An input audio signal is received, the signal having a duration in a second range of durations, shorter than the first durations. A level of the distortion in the input audio signal is estimated by applying the trained ML model to the input audio signal.

There is additionally provided, in accordance with another embodiment of the present invention, a system including an interface and processing circuitry. The interface is configured to receive an input audio signal. The processing circuitry is configured to estimate a level of the distortion in the input audio signal by applying the trained ML model to the input audio signal.

An embodiment of the present invention that is described hereinafter provides a system including a memory and a processor. The memory is configured to store a machine learning (ML) model. The processor is configured to (i) obtain a set of training audio signals that are labeled with respective levels of distortion, (ii) convert the training audio signals into respective images, (iii) train the ML model to estimate the levels of the distortion based on the images, (iv) receive an input audio signal, (v) convert the input audio signal into an image, and (vi) estimate a level of the distortion in the input audio signal, by applying the trained ML model to the image.

In some embodiments, the distortion includes a Total Harmonic Distortion (THD).

In some embodiments, the processor is configured to convert a given training audio signal into a given image by setting pixel values of the given image to represent an amplitude of the given training audio signal as a function of time.

In some embodiments, the respective images and the image are two-dimensional (2D).

In some embodiments, the respective images and the image are of three or more dimensions.

In an embodiment, the processor is configured to obtain the training audio signals by (i) receiving initial audio signals having first durations, and (ii) slicing the initial audio signals into slices having second, shorter durations, so as to produce the training audio signals.

In some embodiments, the ML model includes a convolutional neural network (CNN) In some embodiments, the ML model includes a generative adversary network (GAN).

In an embodiment, the input audio signal is received from nonlinear audio processing circuitry.

In an embodiment, the ML model classifies the distortion according to the levels of distortion that label the training audio signal.

In another embodiment, the ML model estimates the level of distortion using regression.

In some embodiments, the processor is further configured to control, using the estimated level of the distortion, an audio system that produces the input audio signal.

There is additionally provided, in accordance with another embodiment of the present invention, a system including a memory and a processor. The memory is configured to store a machine learning (ML) model. The processor is configured to (i) obtain a plurality of initial audio signals, which have first durations in a first range of durations and which are labeled with respective levels of distortion, (ii) slice the initial audio signals into slices having second durations in a second range of durations, shorter than the first durations, so as to produce a set of training audio signals, (iii) train the ML model to estimate the levels of the distortion based on the training audio signals, (iv) receive an input audio signal having a duration in the second range of durations, and (v) estimate a level of the distortion in the input audio signal by applying the trained ML model to the input audio signal.

In some embodiments, the processor is configured to train the ML model by (i) converting the training audio signals into respective images and (ii) training the ML model to estimate the levels of the distortion based on the images.

In some embodiments, the processor is configured to estimate the level of the distortion in the input audio signal by (i) converting the input audio signal into an image and (ii) applying the trained ML model to the image.

In some embodiments, the respective images are two-dimensional (2D) images.

In some embodiments, the respective images are of three or more dimensionals.

There is further provided, in accordance with another embodiment of the present invention, a method including obtaining a set of training audio signals that are labeled with respective levels of distortion. The training audio signals are converted into respective two-dimensional (2D) images. A machine learning (ML) model is trained to estimate the levels of the distortion based on the 2D images. An input audio signal is received. The input audio signal is converted into a 2D image. A level of the distortion in the input audio signal is estimated by applying the trained ML model to the 2D image.

There is furthermore provided, in accordance with another embodiment of the present invention, a method including obtaining a plurality of initial audio signals, which have first durations in a first range of durations and which are labeled with respective levels of distortion. The initial audio signals are sliced into slices having second durations in a second range of durations, shorter than the first durations, so as to produce a set of training audio signals. The ML model is trained to estimate the levels of the distortion based on the training audio signals. An input audio signal is received, having a duration in the second range of durations. A level of the distortion in the input audio signal is estimated by applying the trained ML model to the input audio signal.

The present invention will be more fully understood from the following detailed description of the embodiments thereof, taken together with the drawings in which:

DETAILED DESCRIPTION OF EMBODIMENTS

Overview

Figure 1:
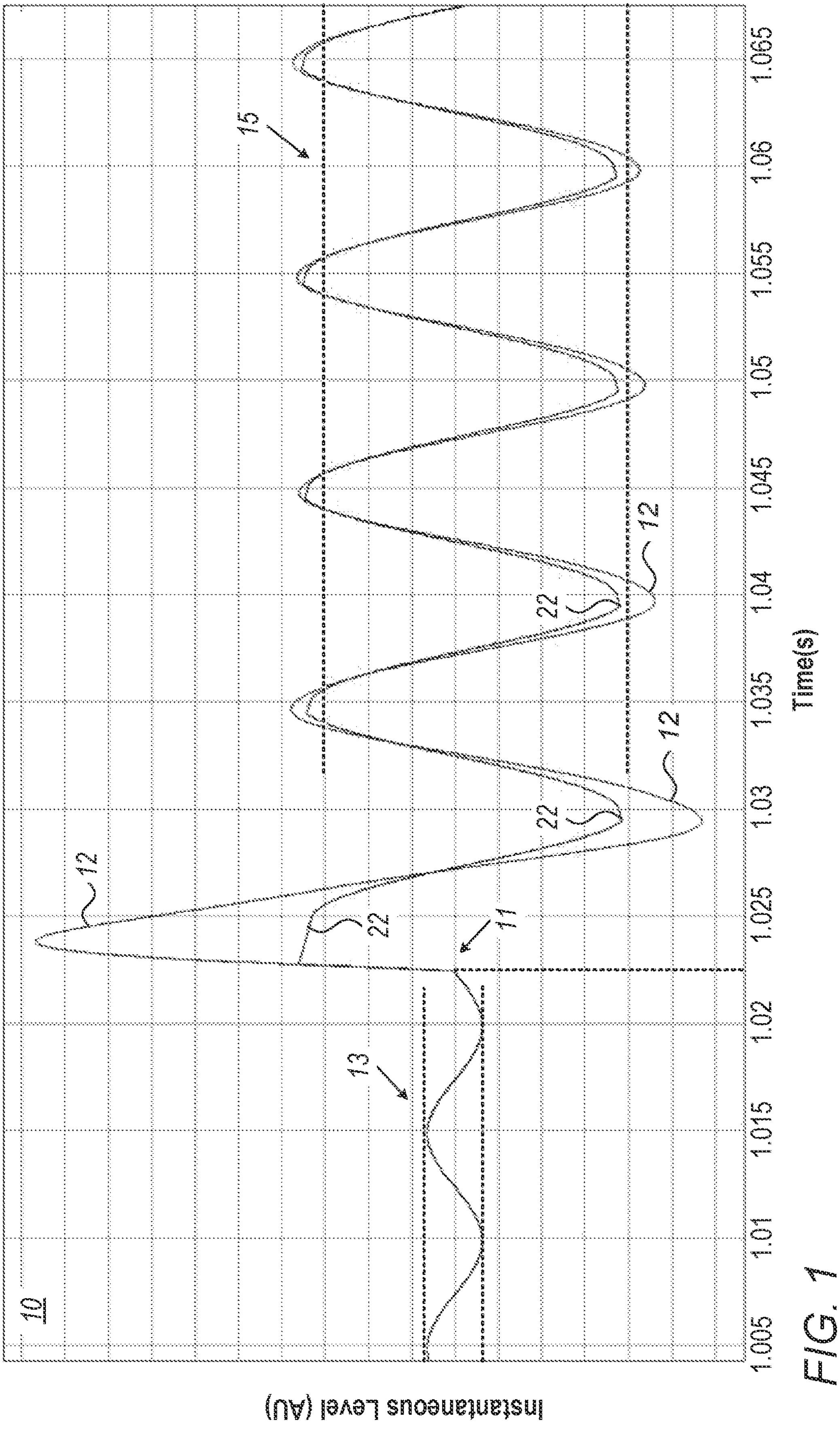
FIG. 1 is a graph showing the effects of audio compression by a Dynamic Range Compressor (DRC) configured with short and long response times on an audio signal, in accordance with an embodiment of the present invention.

Audio (e.g., music or voice) is primarily a form of acoustic energy spread over a continuous or discrete range of frequencies. One technique to characterize the audio quality of an audio device is to measure the Total Harmonic Distortion (THD) that the device introduces into an input audio signal. THD is a measure of the harmonic distortion present in a signal, and is defined as the ratio of the sum of the powers of all harmonic components to the power of a fundamental frequency, the fundamental frequency being a sinewave.

When the main performance criterion is the "purity" of the original sine wave (in other words, the contribution of the original frequency with respect to its harmonics), the measurement is most commonly defined as the ratio of the RMS amplitude, A, of a set of higher harmonic frequencies to the RMS amplitude of the first harmonic, or fundamental, frequency:

$$THD = \frac{\sqrt{A_{2\omega}^2 + A_{3\omega}^2 + A_{4\omega}^2 + A_{5\omega}^2 \ldots}}{A_\omega}$$

In audio systems, a lower THD (i.e., lower distortion) means that audio components such as a loudspeaker, an amplifier, a signal processing unit, a microphone or other audio equipment, produce a more accurate reproduction of the original input audio.

The distortion of a waveform relative to a pure sinewave, for example, can be measured either by using a THD analyzer to analyze the output wave into its constituent harmonics and noting the amplitude of each harmonic relative to the fundamental, or by cancelling out the fundamental with a notch filter and measuring the remaining signal, which will be a total aggregate harmonic distortion plus noise.

Given a sine wave generator of very low inherent distortion, the generator's output can be used as an input to amplification equipment, whose distortion at different frequencies and signal levels can be measured by examining the output waveform. While dedicated electronic equipment can be used to both generate sinewaves and to measure distortion, a general-purpose digital computer equipped with a sound card and suitable software can carry out harmonic analysis.

Identifying various different frequencies from an incoming time-domain signal is typically done using a Fourier transform, which is based on mathematical integration. This process requires a signal with a minimal time duration to achieve a specific spectral resolution required of the measurement. Therefore, THD can only be well defined for a sufficient number of cycles of an incoming time-domain signal. For example, to measure a low frequency sine wave (e.g., a bass monotone at 100 Hz and corresponding cycle of 10 mSec), the incoming time-domain signal must be stable over at least several hundred milliseconds (i.e., at least over several tens of cycles).

This means that THD cannot be estimated for an "instantaneous" audio signal, such as an audio performance during a sound-dominant portion of a beat of a drum that, typically, lasts a few tens of milliseconds at most. The human ear, on the other hand, can recognize distortion of such a drum beat.

In particular, the absence of a THD measurement precludes (a) using the measure to design a more linear system (when the distortion is unintentional), and (b) using the measure, including in real time, to control (e.g., limit) an amount of intentional distortion, such as that introduced by a non-linear audio processing element.

Embodiments of the present invention that are described herein provide systems and methods that define and estimate a level of the distortion in an audio signal, by applying a machine learning (ML) model (e.g., an artificial neural network (ANN)) and artificial intelligence (AI) techniques, such as using a trained ML model. Some embodiments define and estimate a harmonic distortion by defining and estimating "virtual THD' (vTHD), which can be described as a measure of an instantaneous THD. For audio signals for which THD is well defined, vTHD coincides with THD up to a given tolerance (e.g., allowing a classification error to a nearest labeled THD value, such as one smaller or one larger of the classified THD value). However, when THD fails for very short duration audio signals, vTHD provides a new standard for estimating audio quality based on the disclosed technique that estimates vTHD of such signals.

Some embodiments of the disclosed solution are focused on sensing and quantifying harmonic distortions, regardless of noise, in a very short time. This feature makes the disclosed techniques applicable to dynamic (i.e., rapidly varying) signals and provides a powerful tool for better system engineering.

The disclosed ML techniques are able to systematically quantify the so-called "instantaneous" THD (i.e., the entity vTHD) on complex signals (e.g., a drum beat) and at very short times (e.g., several milliseconds).

To illustrate the challenge and the capabilities of such an ML technique, one can consider, by way of example, a Dynamic Range Compressor (DRC) nonlinear audio device that maps an input dynamic range to a smaller dynamic range in the output side. This sort of compression is usually achieved by lowering the high energy parts of the signal.

There is a strong relation between the response times of a DRC to the amount of harmonic distortion it will create as a side effect. As a general example, a very fast response time (e.g., 1 mSec) setting on a very slow signal (e.g., 100 Hz) will create distortions once the compressor significantly attenuates the output. A DRC might have different response-time operation profiles from which to select. So, with the disclosed technique, a designer and system architect of such a device can quantify, using a vTHD scale, the distortion level of one DRC design over another.

The disclosed technique is by no means restricted to DRCs. A DRC embodiment is described later in detail since DRCs are a very common tool and since DRC's distortion artefact is controllable, making this use-case a good tool for explaining the technique.

In some embodiments, the disclosed technique endeavors to detect audio distortion in an audio signal that is presented as a picture (e.g., into 2D information). To this end, the disclosed technique classifies a set of distortions according to a model trained by using signals that were sliced from longer signals having a measurable THD. In particular, the THD of the longer signals can be measured by a laboratory-grade analyzer. The technique trains an ML model with a set of short (e.g., sliced) signals to classify any short signal according to the sets of labels, where the label is now converted one-to-one from THD to vTHD, with the vTHD of a distortion determined only by inference.

One scenario that justifies this conjecture on conversion validity is to consider a long stable signal (e.g., lasting few hundred cycles) from which THD can be measured. By slicing only several cycles of the long signal, a very short signal is received, on which THD is undefined, but any distortion is still present, and therefore a valid definition of vTHD scale would follow the rule:

vTHD(sliced_signal):=THD(long_signal)

In one embodiment, a system is provided that includes a memory configured to store a machine learning (ML) model and a processor, which is configured to perform the following steps:

(i) obtain a plurality of initial audio signals, which have first durations in a first range of durations and which are labeled with respective levels of distortion. In the contexts of embodiments of this invention "Obtain" means "receive from the outside and/or produce internally."

(ii) preprocess the initial audio signals slices by slicing the initial audio signals into slices having second durations in a second range of durations, shorter than the first durations, so as to produce a set of training audio signals.

(iii) train the ML model to estimate the levels of the distortion based on the training audio signals. For example, train the ML model to estimate the vTHD of the preprocessed audio signals.

(iv) receive an input audio signal having a duration in the second range of durations.

(v) estimate a level of the distortion (e.g., level of vTHD) in the input audio signal by applying the trained ML model to the input audio signal.

In a particular embodiment, the processor is configured to train the ML model by (i) converting the training audio signals into respective images (e.g., two-dimensional (2D) images) and (ii) training the ML model to estimate the levels of the distortion based on the images. The processor is configured to estimate the level of the distortion in the input audio signal (e.g., it's vTHD) by (i) converting the input audio signal into a 2D image and (ii) applying the trained ML model to the 2D image. Note, however, that the disclosed technique can convert audio signals into multi-dimensional mathematical structures (e.g., 3D and more), such as tensors, to, for example, utilize dedicated computing hardware such as graphics processing units (GPUs) or tensor processing units (TPUs). Moreover, given a type of ML model (e.g., a type of NN) which is optimized to another mathematical structure at its input, the disclosed technique can, mutatis mutandis, convert an audio signal to that structure, such as a 3D image or a greyscale image, and apply it the given type of the trained ML model.

The training audio signals are typically labeled according to a ground truth scale of the THD, to, for example, estimate and classify the new preprocessed audio signal, during inference, according to the different labels of THD. The processor runs the ML model to infer the new preprocessed audio signal and to classify the new audio signal according to the different labels of THD with the respective vTHD. However, as no actual THD measurement could have been performed, the ML model is trained to recognize a distortion pattern on brief signals. In this way, as noted above, the vTHD serves as a consistent scale for comparing audio processing performance of very short duration signals.

In one embodiment, the processor is configured to preprocess the training audio signals by converting each audio signal into a respective 2D image. For example, the processor is configured to convert each audio signal into a respective black and white 2D image by binary coding the audio signals in a 2D plane comprising a temporal axis and a signal amplitude axis, which is manifested as encoding an area confined by the graph as black while encoding the rest of the 2D image is white, as described below.

In another embodiment, the training samples are sliced and used in this way as a 2D image input for training without further preprocessing (e.g., without the black and white area encoding), and a new signal is not preprocessed before the ML model runs inference on that audio signal.

In yet another embodiment, the ML model uses ANN as a generative adversary network (GAN) which is particularly flexible in learning and inferring arbitrary waveforms. In general, various ML models may be used with data format optimized (e.g., converted from the audio samples) for the given ML model.

Moreover, with the necessary changes being made, the disclosed technique can identify and estimate audio distortion other than harmonic ones. For example, the disclosed technique may be applied, mutatis mutandis, to identify and estimate one of phase noise, chirp, and damping in audio signals.

ANNs such as long short-term memory (LSTM) recursive NN (RNN), and 1D convolutional NN (CNN), are highly efficient. For example, using such networks, a system for estimation of vTHD can run at higher accuracy (24-bit precision in one example) as the main bottle-neck which called for reduction of the bit rate—the read-write cycles into memory—is eliminated with such NNs.

Furthermore, a model based on RNN, the LSTM ANN is highly suitable for the analysis of audio signals. Due to its recurrent connection between the neurons in RNN, it uses temporal information of the inputted data.

As described below, in some embodiments an LSTM and 1D CNN accept audio signals directly, for example, with minimal preprocessing in the 1D signal domain, such normalizing initial (e.g., training signals) and an input signal. Alternatively to LSTM, the disclosed technique may apply ML models such as Gater Recurrent Unit (GRU) or Transformer (a deep learning model that adopts the mechanism of self-attention. Transformers were introduced in 2017 by a team at Google Brain and are increasingly the model of choice for NLP problems, replacing RNN models such as LSTM).

By providing a ML-based audio distortion scale called virtual THD, audio engineers can quantify audio performance that cannot be quantified using existing techniques.

DRC-Induced Audio Distortion Over Short Time Durations

The time duration needed for a DRC to respond to (i.e., compress) an increased input signal ("attack"), or for a DRC to stop its processing ("release"), is a crucial parameter to audio quality. A user cannot simply "set the attack and release" to a minimum, because an exceedingly short attack and release setting creates harmonic distortion. This artefact, e.g., THD, is a by-product of the DRC setting in conjunction with the input signal and its properties.

The THD of an output signal (i.e., a THD which is a by-product of the DRC setting) is easily noticeable by a human listener and hence each DRC has its attack and release knobs (or auto setting). Even more, THD is viewable on a waveform display.

Albeit being both audible and viewable to a human user, it is quite surprising to see that there is no measurement method which quantifies this distortion. This lack of quantification leads to a reality in which DRC engineers and system designers lack a scientific measurement tool which can help systemize the development process of future DRCs by means of quantifying the artefacts. As mentioned above, this is true not only for DRC, but in fact to any non-linear processor (Gates, Limiters, Saturators, etc.).

FIG. 1 is a graph 10 that shows the effect of audio compression on an audio signal, the compression performed by a Dynamic Range Compressor (DRC) configured with short and long response times, in accordance with an embodiment of the present invention.

In the shown embodiment, a compressor or a DRC maps an input dynamic range 13 of an incoming sinewave signal into a target dynamic range 15, set by the user. This process involves setting (or auto setting) a threshold audio energy, above which the DRC will compress and under which the DRC will not alter the signal, the ratio of compression as well as the attack and release.

In the example of FIG. 1, the input signal has a fixed frequency of 1 KHz with an amplitude that can be varied below and above the threshold value of the DRC. In the example measurement of FIG. 1, the DRC threshold is −15 dB, with a compression ratio of 1:99. with two different attack times (10 μSec vs. 2 mSec) the output result distortion is very vivid visually. As seen, the short attack time results in a signal 22 that is highly distorted. On the other hand, a signal 12, which results from the long attack time, is largely a sinewave, with some amplitude modulation.

However, the different level of distortion exhibited by signals 22 and 12 is not quantifiable to date, as explained above. The present disclosure provides embodiments that can quantify the different short-duration audio distortions (e.g., distortions taking place over a time duration smaller than several milliseconds).

System Description

Figure 2:
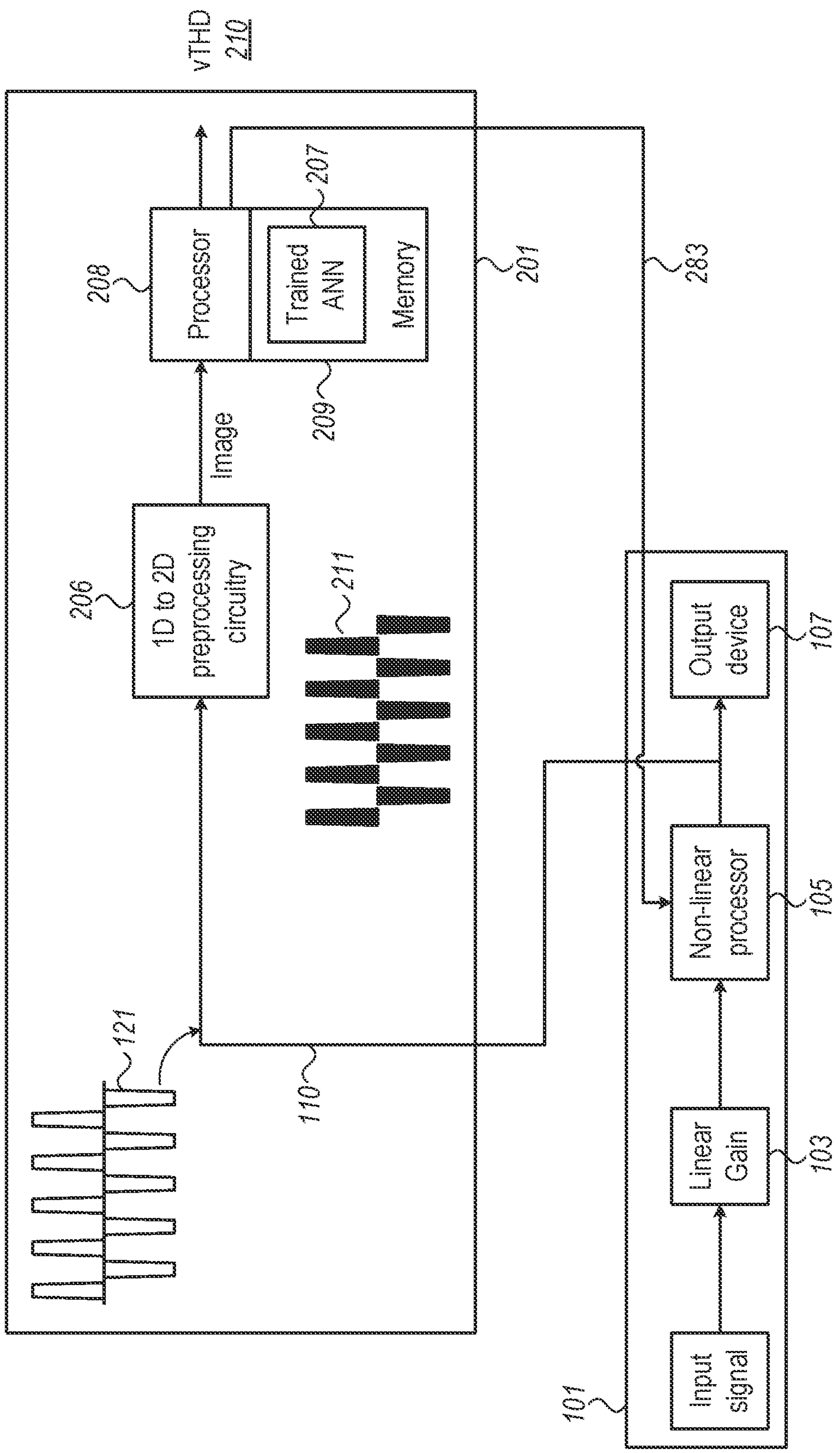
FIG. 2 is a block diagram schematically illustrating a system for estimation of virtual total harmonic distortion (vTHD) of a short audio sample output by an audio processing apparatus, in accordance with an embodiment of the present invention.

FIG. 2 is a block diagram schematically illustrating a system 201 for estimation of virtual total harmonic distortion (vTHD) of a short audio sample (121) outputted by an audio processing apparatus 101, in accordance with an embodiment of the present invention.

As seen, system 201 is coupled to audio processing apparatus 101 that comprises a linear gain circuitry 103 that does not distort the input signal, and a non-linear processor 105, such as the aforementioned DRC, that may distort the linearly amplified input signal. The output signal is directed to an output device 107, such as a loudspeaker.

System 201 for estimation of vTHD is configured to estimate the nonlinear audio effect of audio processing apparatus 101, and in particular of non-linear processor 105, by providing a vTHD 210 grade of an unintentional distortion introduced by non-linear processor 105. Using the estimated vTHD enables a user, or a processor, to optimize settings of apparatus 101 to optimize an intentional amount of distortion, such as to limit an intentional distortion to a desired level.

As further seen, system 201 is inputted with an audio signal 121 that is distorted after being processed by non-linear audio processing circuitry 105.

Figure 3:
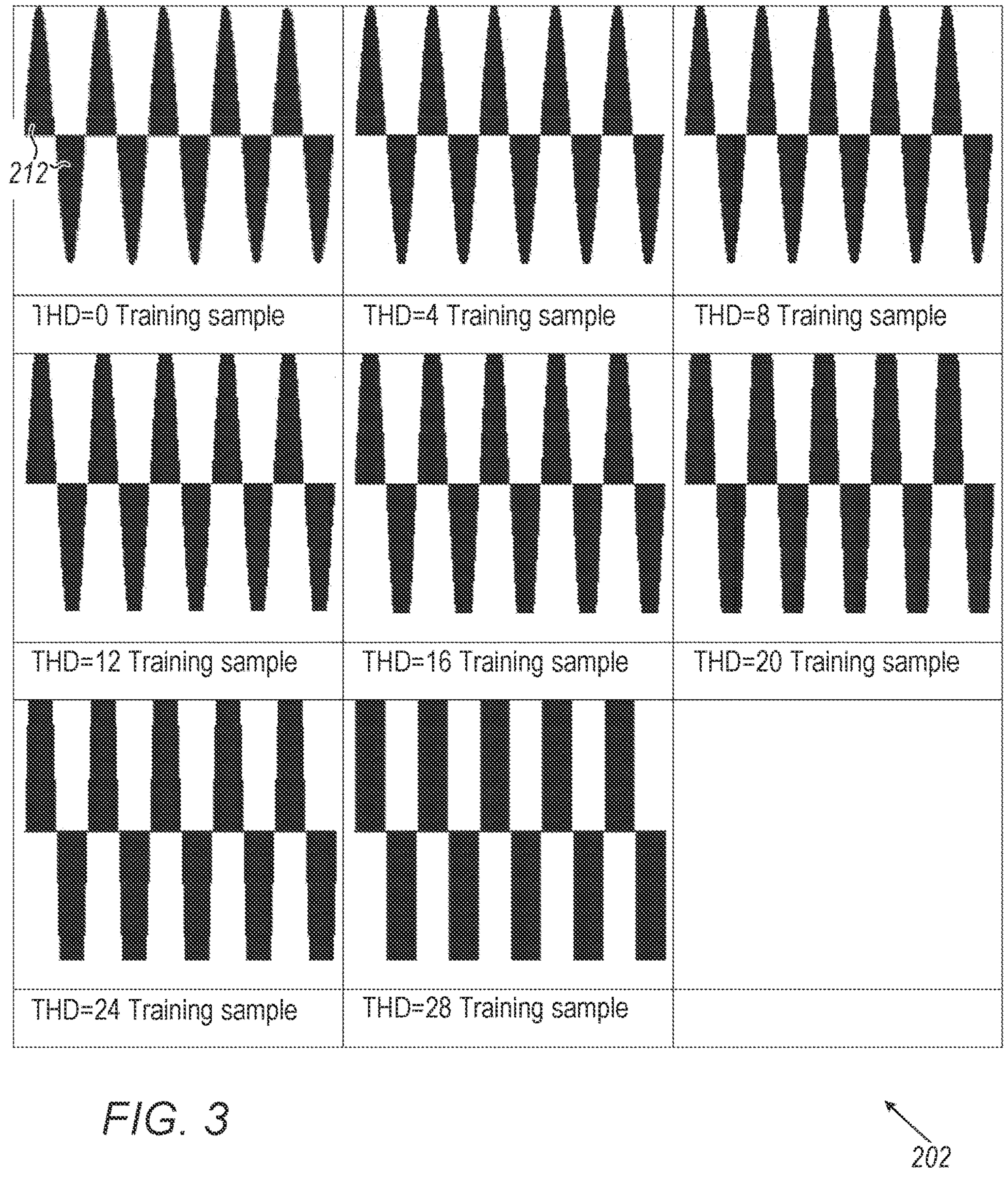
FIG. 3 shows a set of two-dimensional (2D) images used in training an artificial neural network (ANN) in the system of FIG. 2, in accordance with an embodiment of the present invention.

A processor 208, or a preprocessing circuitry 206, performs preprocessing of audio signal 121 by converting (e.g., encoding) the 1D waveform of signal 121 into a 2D black and white image 211, such as the images seen in FIG. 3. In other words, processor 208 converts a given training audio signal into a given 2D image by setting pixel values of the 2D images to represent an amplitude of the given training audio signal as a function of time.

Then, processor 208 runs a trained ANN 207 (that can be a convolutional ANN (CNN) or a GAN, to name two options, that is held in a memory 209 to perform inference on image 211 to estimate vTHD 210 of signal 121.

Finally, a feedback line 283 between processor 208 and non-linear processor 105 enables controlling the amount of artefacts in output audio signal 121, based on the estimated vTHD. Such feedback line may alternatively, or additionally, be used between processor 208 and linear gain circuitry 103.

The embodiment of FIG. 2 is depicted by way of example, purely for the sake of clarity. For example, preprocessing circuitry 206 may perform another type of preprocessing, or, for a given suitable ML model being used, perform no preprocessing of the training samples 121 (e.g., aside from slicing them after measuring THD).

The different elements of system 201 and audio processing apparatus 101 shown in FIG. 2 may be implemented using suitable hardware, such as one or more discrete components, one or more Application-Specific Integrated Circuits (ASICs) and/or one or more Field-Programmable Gate Arrays (FPGAs). Some of the functions of system 201 may be implemented in one or more general purpose processors programmed in software to carry out the functions described herein.

The software may be downloaded to the processors in electronic form, over a network or from a host, for example, or it may, alternatively or additionally, be provided and/or stored on non-transitory tangible media, such as magnetic, optical, or electronic memory.

Preprocessing of Audio Signals for Subsequent Determination of vTHD Using an ANN FIG. 3 shows a set 202 of two-dimensional (2D) images used in training an artificial neural network (ANN) 207 in the system of FIG. 2, in accordance with an embodiment of the present invention. As seen, images of set 202 are associated with progressively increasing THD levels. The THD was measured on training audio signals from which the 2D images were generated, the training audio signals being each of 48 cycle length (i.e., samples with duration of 48 mSec) at 1 KHz). The preprocessed 2D images were generated after the training audio samples were truncated (e.g., sliced) to leave only five cycles. Thus, the training uses short duration samples (e.g., of five cycles of a 1 KHz wave), with total duration of each sample being 5 milliseconds. This duration is considered very short and does not allow, for example, meaningful FFT analysis of harmonic distortion, as emphasized above. In principle, a signal can be truncated to as little as a fraction of a cycle (e.g., quarter cycle), and the disclosed technique will generate a vTHD scale of distortion using such ultrashort audio signals. Using truncated signals further allows to, for example, maximize tolerance of the disclosed technique to low signal-to-noise ratio, while gaining on the analysis of ultra-short duration audio harmonic distortions.

Set 202 of training images is a cascade of preprocessed sine-wave signals with the initial sine wave signals with an increasing "digital saturation" level that clips the sine wave at its minimum and maximum absolute values. As seen, the clipping is first none, i.e., starting with zero clipping having a THD=0, with the saturation effect increasing all the way to a maximal clipping that results in a rectangular wave-like waveform with a measure (e.g., ground truth) THD of 28. In the given example, the actual testing starts, for simplicity of presentation, from 4% THD (i.e., THD=4), as described in FIG. 4. While FIG. 4 was generated using training data with THD≥4, for clarity of presentation, the figure also applies to working range of THD between 0 to 4.

The increased level of THD reflects a growing relative contribution to a signal of higher harmonics (3ω, 5ω, 7ω . . . ), pure, sinus harmonics at ω.

Each 2D image of set 202 is received from a 1D waveform similarly to how image 211 is received from respective waveform 121, as described in FIG. 2.

In particular, the preprocessing may use a code that blacks areas 212 between the envelope and the horizontal axis, and maintains white the rest of each image.

In the particular example exemplified by FIG. 3, data preprocessing includes these steps:

1. Data digitization (8-bit): Each waveform i out of N waveforms of a set like set 202 is sampled by a sequence in time $\{S_j\}$ with j being the temporal index.

Data normalization: All data sample values are normalized to −1 to 1.

2. Data transformation: In order to use a convolutional NN (CNN) architecture of an ANN, the data is transformed from 1D data (sequence data-audio signal) to 2D data:
   - 2.1. Every sine wave sample array is transformed into a matrix (represented in a greyscale picture).
   - 2.2 All matrix cells are initiated as a white color. Each row i represents the amplitude of the sine wave (with a given precision). Each column represents the time j of sampling.
   - 2.3. Filling the matrix: The amplitude of the wave samples i=1, 2, . . . N is transformed using the equation Matrix[(1−Amplitude $[S_{ij}]$)*100] $[S_{ij}]$=0. (Black color).

By applying this step, all the areas between Si amplitude and the zero-amplitude row (were filled in white as well—this was done to add more data inside every sample. This method maximizes the contrast of the signals for better image processing.

Analysis of Performance of ANN in Classifying vTHD

In the field of ML, and specifically the problem of statistical classification, a confusion matrix, also known as an error matrix, is a specific table layout that allows visualization of the performance of an algorithm, typically a supervised learning algorithm (i.e., one that uses labeled training data for learning). Each row of the matrix represents the instances in an actual class while each column represents the instances in a predicted class, or vice versa. The name stems from the fact that it makes it easy to see whether the system is confusing two classes (i.e., commonly mislabeling one as the other).

Figure 4:
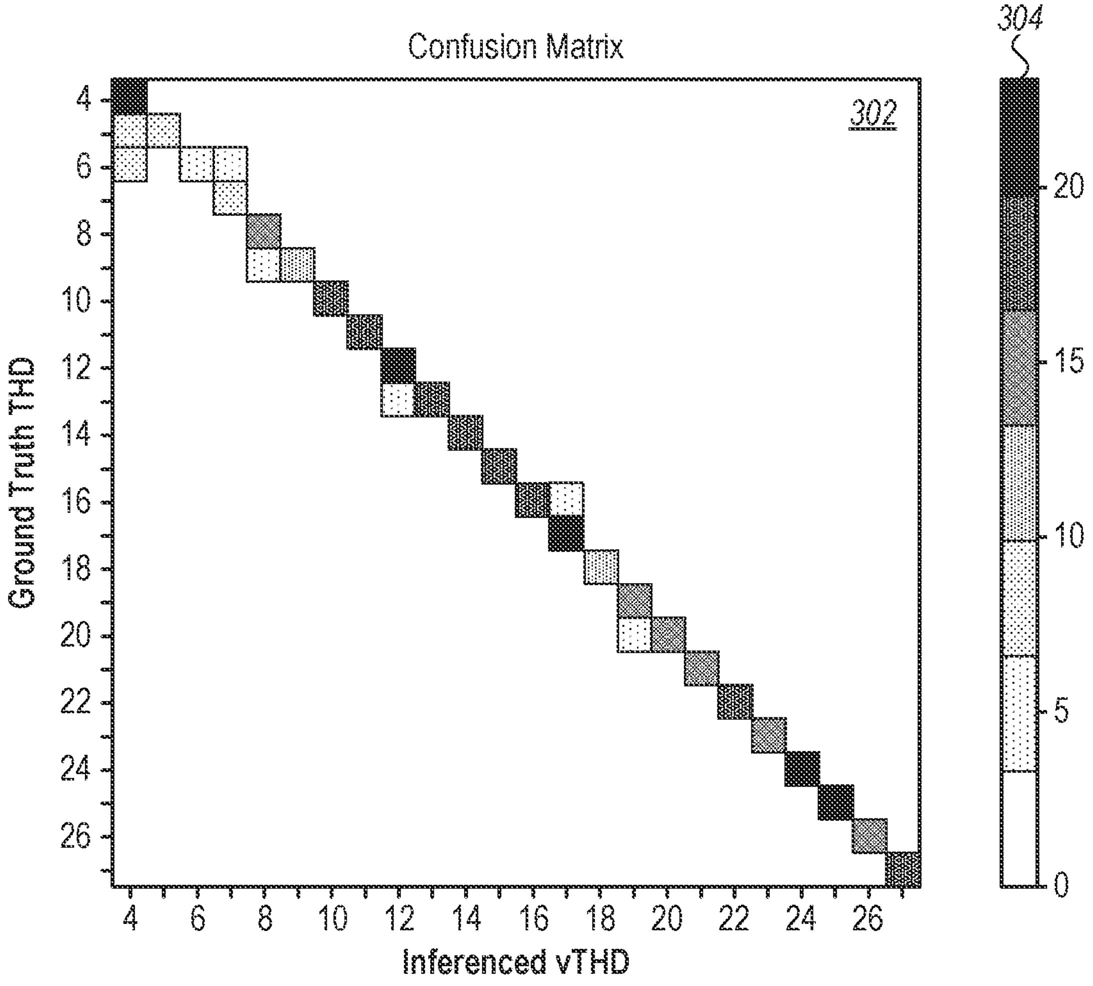
FIG. 4 illustrates a confusion matrix comparing vTHD estimated using the system of FIG. 2 to a ground-truth THD of FIG. 3, in accordance with an embodiment of the present invention.

FIG. 4 illustrates a confusion matrix 302 comparing vTHD 210 estimated using system 201 of FIG. 2 to ground-truth THD of FIG. 3, in accordance with an embodiment of the present invention. The number of samples inferenced at each THD level is indicated by a scale 304, with number of samples ranging between few to more than 20.

As seen, for THD>4, the errors made during inference by the trained ANN model 207 are deviations by one class at most (for example, some audio samples with THD=j may have been classified as having VTHD=j+1 or VTHD=j−1). The vast majority of audio samples were accurately classified by system 201.

The shown example of FIG. 4 is brought by way of example. As another example, rather than use classification to estimate an error in vTHD compared to a ground truth THD, a ML model my use a regression-based scoring, as described below.

Method of Estimating of vTHD of a Short Audio Sample

Figure 5:
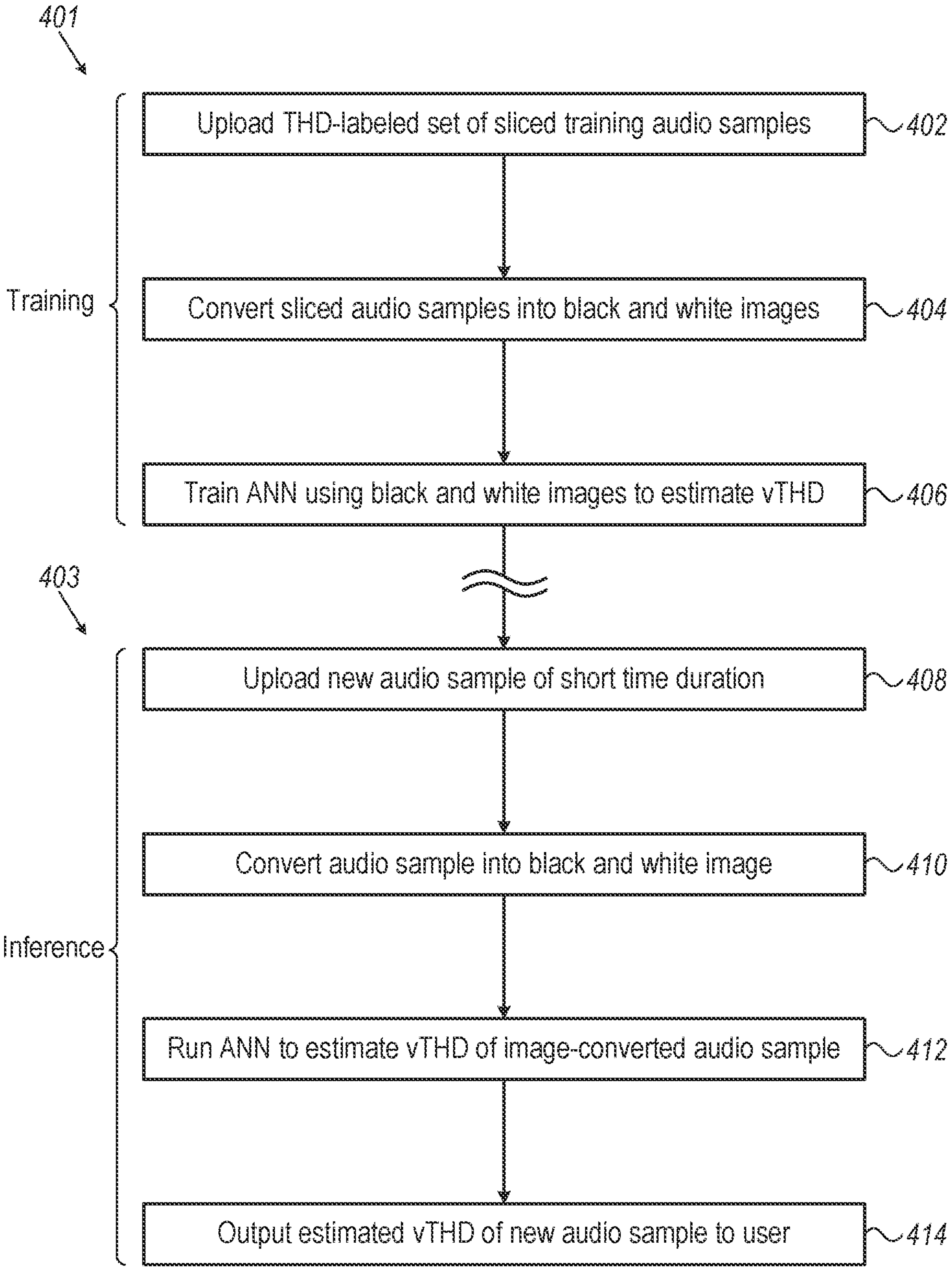
FIG. 5 is a flow chart that schematically illustrates a method for estimation of vTHD of a short audio sample using the system of FIG. 2, in accordance with an embodiment of the present invention.

FIG. 5 is a flow chart that schematically illustrates a method for estimation of vTHD of a short audio sample using system 201 of FIG. 3, in accordance with an embodiment of the present invention. The algorithm, according to the presented embodiment, carries out a process that is split between a training phase 401 and an inferencing phase 403.

The training phase begins at an uploading step 402, during which processor 208 uploads a set of short (e.g., sliced) training audio samples, like the 5-cycle audio sample used in FIG. 3, from memory 209. Next, processing circuitry 206 converts the audio samples into black and white images, as shown in FIG. 3, at a data format conversion step 404.

In an ANN training step 406, processor 208 trains ANN 209 using the black and white images to estimate a vTHD of an audio signal.

Inference phase 403 begins by system 201 receiving as an input a short time duration audio sample (e.g., of several milliseconds duration), at an audio sample inputting step 408.

Next, processing circuitry 206 converts the short audio sample into a black and white image, at a data format conversion step 410. Then, processor 208 runs the trained ANN 209 to estimate a vTHD value of the audio sample, at a vTHD estimation step 412. Finally, at a vTHD outputting step 414, processor 208 of system 201 outputs the estimated vTHD to a user, or to a processor, to, for example, adjust a nonlinear audio stage according to a desired vTHD value, such as to adjust a saturation level imposed by nonlinear audio processor 105 of audio processing apparatus 101.

The flow chart of FIG. 5 is brought purely by way of example, for the sake of clarity. For example, other preprocessing steps, or fewer steps, may be used.

Regression-Based vTHD Estimation

As noted above, a regression-based scoring may be used in addition, or as alternative to vTHD estimation by classification shown in FIG. 4. In a regression-based scoring, the system uses the same processed data (either the white painted data and/or the black painted can be used). In this embodiment, the CNN uses a predicts mean squared error function as a loss function, to output a number that indicates how close the vTHD is to the ground truth THD value.

The algorithm follows the steps of:

Preprocessing:

1. Using for training same waveforms same as in the classification architecture.
2. Normalizing THD values stacked to Y vector and normalized for [0,1] values.
3. Data splitting using random generators as in the classification network.

Outputting:

1. A normalized vTHD value.
2. In case a training audio sample is estimated, outputting an estimated error between the CNN prediction of vTHD for the sample and the true value of THD that was measured on an initial audio signal. For example, assuming the model gives a result of vTHD=0.8 (normalized)—the ground truth THD may be within the range of [0.75, 0.85].

The accuracy of both the classification method and the regression-based method can be improved with data sampling precision, by, for example, using a 16-bit digitization scheme instead of the 8-bit used.

Note that, mathematically, the data set looks different for classification and regression problem in terms of Y vector (For classification—for every example $S_j$ there is a 1D classification vector. For regression for every example $S_j$ there is a scalar regression score).

System for Directly Estimating a vTHD of a Short Audio Sample

Figure 6:
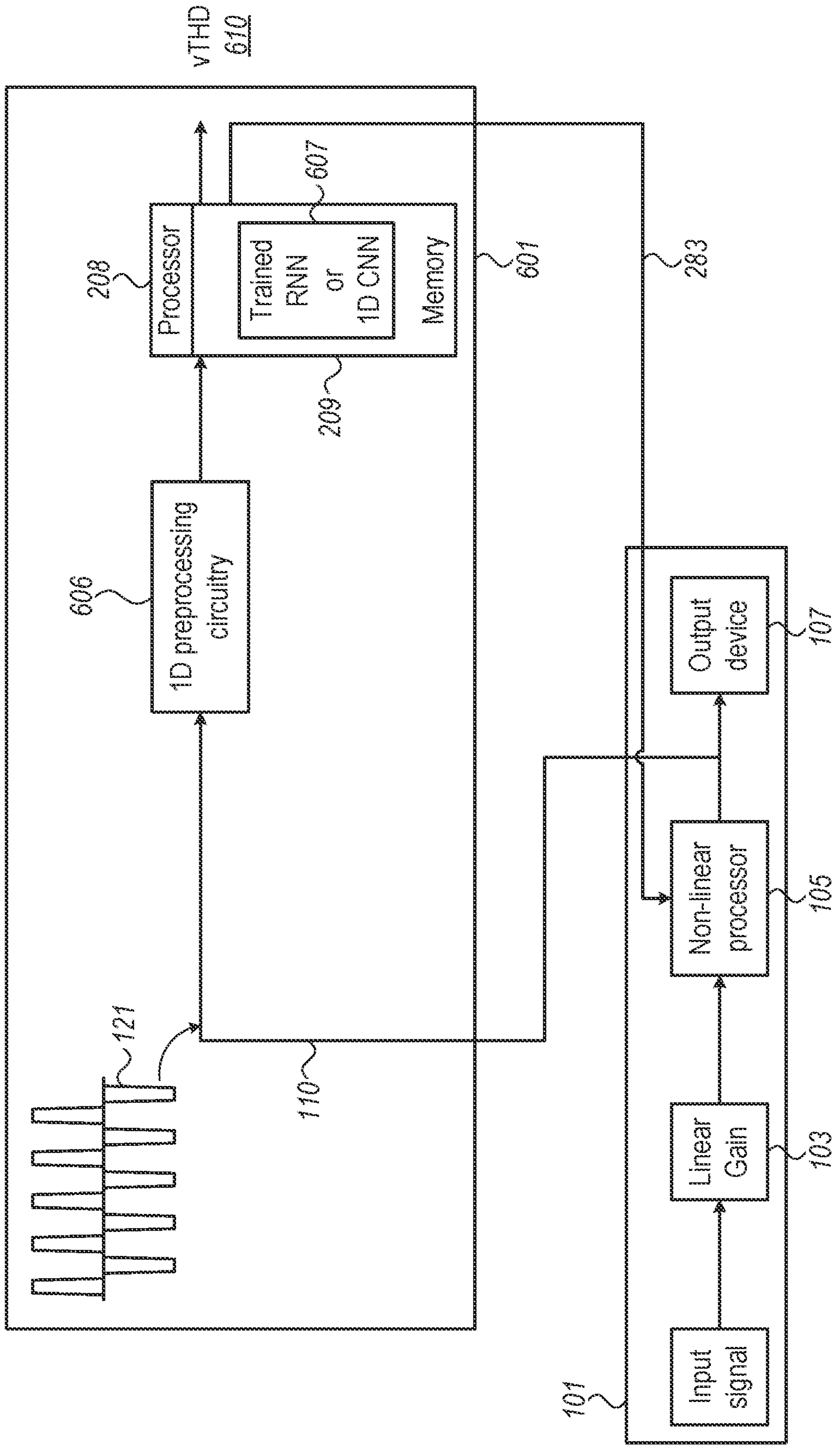
FIG. 6 is a block diagram schematically illustrating a system for one-dimensional (1D) estimation of virtual total harmonic distortion (vTHD) of a short audio sample output by an audio processing apparatus, in accordance with an embodiment of the present invention.

FIG. 6 is a block diagram schematically illustrating a system 601 for one-dimensional (1D) estimation of virtual total harmonic distortion (vTHD) of a short audio sample output by an audio processing apparatus, in accordance with an embodiment of the present invention.

As seen, system 601 is coupled to audio processing apparatus 101 that comprises a linear gain circuitry 103 that does not distort the input signal, and a non-linear processor 105, such as the aforementioned DRC, that may distort the linearly amplified input signal. The output signal is directed to an output device 107, such as a loudspeaker. Note that steps 601-606 of preprocessing are needed only for 1D CNN. It is not required for LSTM system, although can be used.

System 601 for estimation of vTHD is configured to estimate the nonlinear audio effect of audio processing apparatus 101, and in particular of non-linear processor 105, by providing a vTHD 610 grade of an unintentional distortion introduced by non-linear processor 105. Using the estimated vTHD enables a user, or a processor, to optimize settings of apparatus 101 to optimize an intentional amount of distortion, such as to limit an intentional distortion to a desired level.

As further seen, system 601 is inputted with an audio signal 121 that is distorted after being processed by non-linear audio processing circuitry 105.

A processor 208, or a preprocessing circuitry 606, performs 1D preprocessing of audio signal 121 by digitizing and normalizing the 1D waveform of signal 121. Preprocessing circuitry 606 digitizes the initial signals and normalize the digitized initial signals using a given minimal digital precision level, such as 24-bit Then, processor 208 runs a trained RNN 607 (or alternatively a 1D CNN, to name two options), that is held in memory 209 to perform inference on audio signal 121 to estimate vTHD 610 of signal 121. In one embodiment, RNN 607 is the aforementioned LSTM ANN, which is further described below in FIG. 8. As noted above, RNNs such as GRU and Transformer can alternatively be used.

Finally, a feedback line 283 between processor 208 and non-linear processor 105 enables controlling the amount of artefacts in output audio signal 121, based on the estimated vTHD. Such feedback line may alternatively, or additionally, be used between processor 208 and linear gain circuitry 103.

The different elements of system 601 and audio processing apparatus 101 shown in FIG. 2 may be implemented using suitable hardware, such as one or more discrete components, one or more Application-Specific Integrated Circuits (ASICs) and/or one or more Field-Programmable Gate Arrays (FPGAs). Some of the functions of system 601 may be implemented in one or more general purpose processors programmed in software to carry out the functions described herein.

The software may be downloaded to the processors in electronic form, over a network or from a host, for example, or it may, alternatively or additionally, be provided and/or stored on non-transitory tangible media, such as magnetic, optical, or electronic memory.

Figure 7:
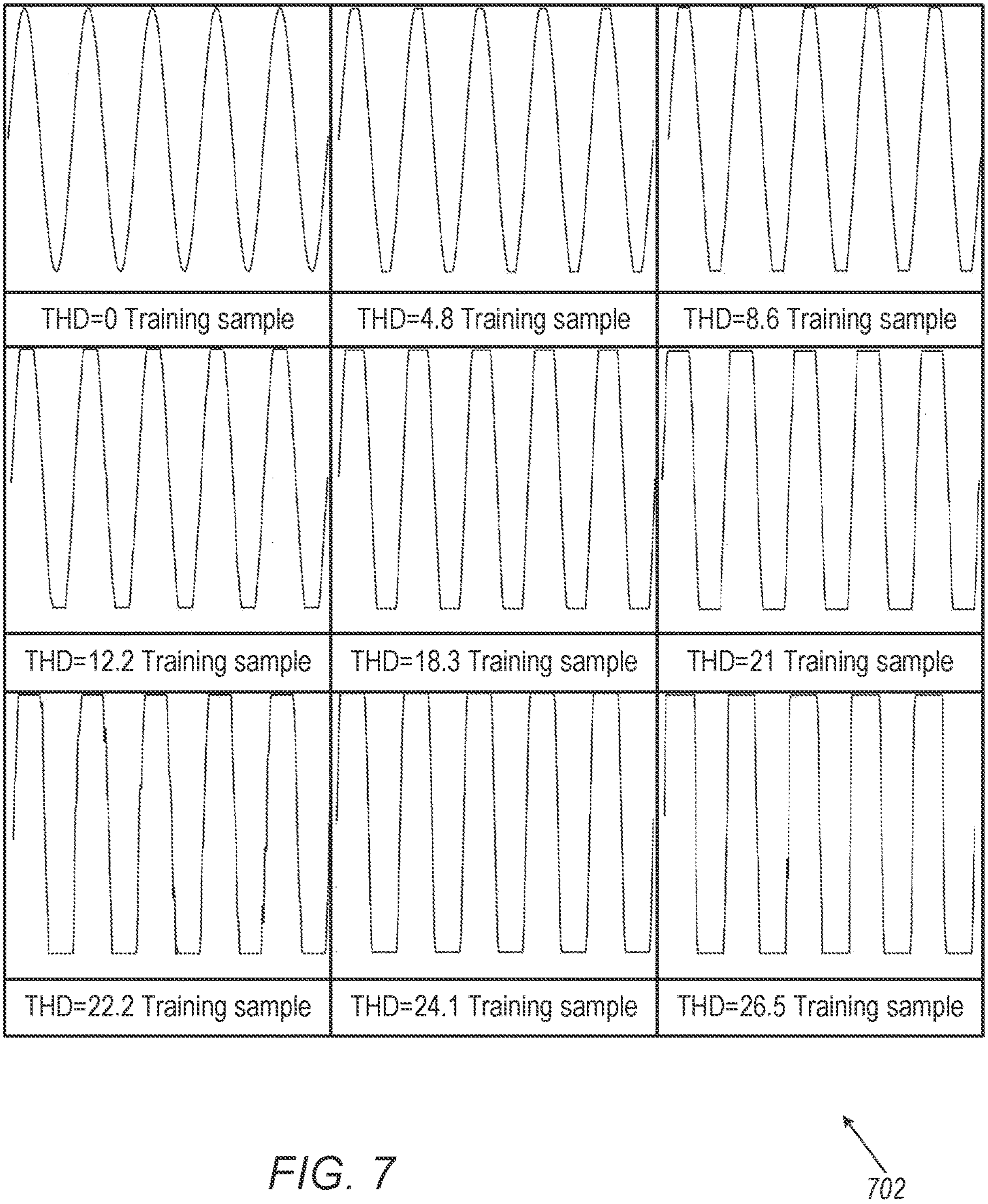
FIG. 7 shows a set of one-dimensional (1D) audio signals used in training an artificial neural network (ANN) in the system of FIG. 6, in accordance with an embodiment of the present invention.

Preprocessing of Audio Signals for Subsequent Determination of vTHD Using an RNN or 1D-CNN FIG. 7 shows a set 702 of one-dimensional (1D) audio signals used in training an artificial neural network (ANN) in the system of FIG. 6, in accordance with an embodiment of the present invention.

As seen, images of set 702 are associated with progressively increasing THD levels. The THD was measured on training audio signals from which the short audio samples were generated. The preprocessed audio samples were generated after the training audio samples were truncated (e.g., sliced) to leave only five cycles (e.g., samples with duration of 5 mSec at 1 KHz). This duration is considered very short and does not allow, for example, meaningful FFT analysis of harmonic distortion, as emphasized above. In principle, a signal can be truncated to as little as a fraction of a cycle (e.g., quarter cycle), and the disclosed technique will generate a vTHD scale of distortion using such ultrashort audio signals. Using truncated signals further allows to, for example, maximize tolerance of the disclosed technique to low signal-to-noise ratio, while gaining on the analysis of ultra-short duration audio harmonic distortions.

Set 702 of training audio samples is a cascade of preprocessed sine-wave signals with the initial sine wave signals with an increasing "digital saturation" level that clips the sine wave at its minimum and maximum absolute values. As seen, the clipping is first none, i.e., starting with zero clipping having a THD=0, with the saturation effect increasing all the way to a maximal clipping that results in a rectangular wave-like waveform with a measure (e.g., ground truth) THD of 26.5. In the given example, the actual testing starts, for clarity and simplicity of presentation, as effects under 4% are harder to visualize, from 4% THD (i.e., THD=4), as described in FIG. 9.

The increased level of THD reflects a growing relative contribution to a signal of higher harmonics (3ω, 5ω, 7ω . . . ), pure, sinus harmonics at ω.

In the particular example exemplified by FIG. 7, data preprocessing includes these steps:

2. Data digitization (24-bit): Each waveform i out of N waveforms of a set like set 702 is sampled by a sequence in time $\{S_j\}$ with j being the temporal index.

Data normalization: All data sample values are normalized to −1 to 1.

Finally, using AI enables the disclosed technique to estimate vTHD accurately in the presence of audio noises. Given sufficiently large training set that include relevant types of audio noises in training waveforms, the random characteristic of noise, as oppose to harmonic distortion, enables the ML model to accurately estimate the amount of harmonic distortion. As an example, training audio sample of THD=22.2 includes low phase noise of the type that the disclosed trained so ML models easily overcome during inference.

LSTM ANN for Estimating vTHD of a Short Audio Sample

Figure 8:
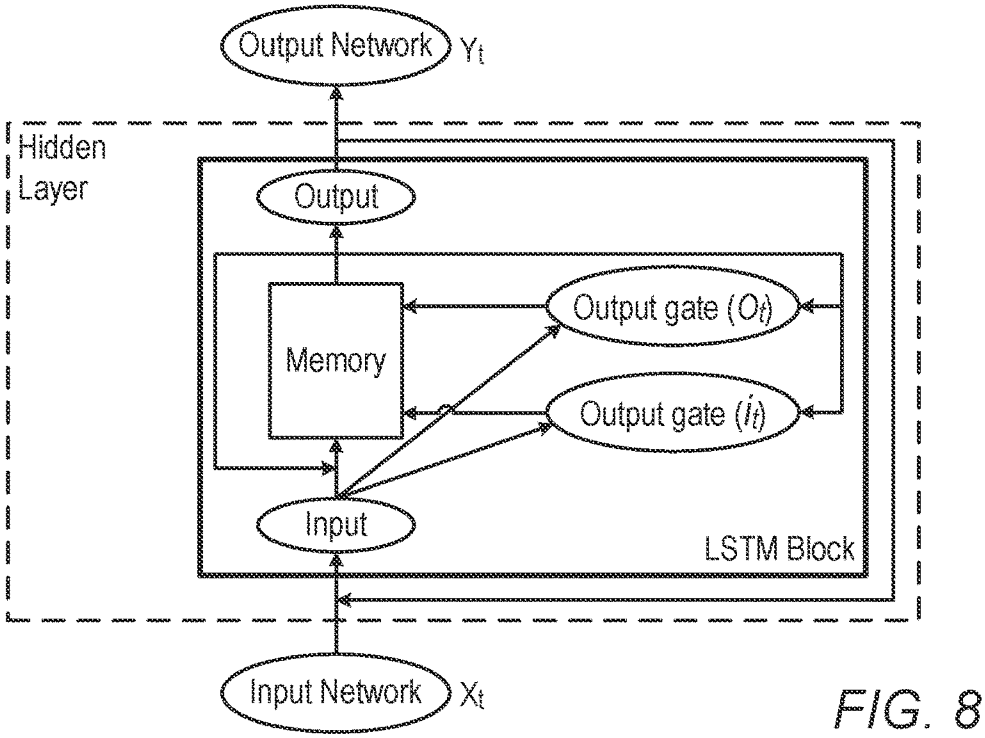
FIG. 8 is a block diagram schematically illustrating an architecture of a long short-term memory (LSTM) ANN type of recursive NN (RNN) used by the system of FIG. 6, in accordance with an embodiment of the present invention.

FIG. 8 is a block diagram schematically illustrating an architecture of a long short term memory (LSTM) ANN type of recursive NN (RNN) used by the system of FIG. 6, in accordance with an embodiment of the present invention. FIG. 8 follow a paper, "Solar Power Prediction Using Deep Learning Technique" by P. Poudel and Bong Jang, in Advanced Science and Technology Letters Vol. 146 (FGCN 2017), pp. 148-151. As seen, an LSTM has a special neuron structure called memory cell. These memory cell will store information over the time. Each memory block consists of three gates: the input gate, forgot gate and output gate. These gates will control the information flow for each neuron.

Furthermore, each gate has an activation function. For example, if the input gate takes a high activation, the input will be stored in the memory cell. If the output gate has a high activation, it will release the stored information to the next neurons. And if the forget gate notes a high activation, the memory cell will be cleared.

The LSTM neural network shown in above figure has $x_t$ input and output $y_t$, where t is the prediction period. it, $f_t$ and $o_t$ are input, forget and output gate respectively.

In this disclosure, the input for LSTM neural network is an audio sample. An LSTM ANN can be configured in a more complicated way than shown as, for example, having an input layer, two hidden layers, and one output layer.

Analysis of Performance of LSTM ANN and 1D-CNN in Classifying vTHD

In one example, the signals are inputted to an LSTM ANN, such as described in FIG. 8, with a regression output. The output of the LSTM ANN gives each signal a score (based on the ground proof THD score from the analyzer).

The regression model predicts a normalized value (between [0,1]—normalized to the maximum THD at the samples.

As an example of an inferenced signal, the signal was measured with an analyzer to have THD value of 23.58. The LSTM ANN predicted THD value of 23.51, with an error THD of 0.07 in vTHD versus the ground truth THD.

In another example, the signals are inputted to 1D-CNN, with a confusion matrix output. Using the regression method—a THD score number vs. classification, in a form of a confusion matrix can be provided. With regression analysis, the mean of the error between the NN prediction for a sample (Xi) and the true value (Yi) is measured. A 14% mean error is obtained for the train set. This means that if the model gives a result of 0.8 THD (normalized)—the real THD is between 0.688 and 0.912—(normalized, in terms of THD this range is between 19.26 and 25.53. While accuracy is worse than the classification estimator, it can be improved by better architecture and more data. Another way of the precision improvement of regression analysis is to increase precision from current 8-bit precision to at least 16-bit.

Figure 9:
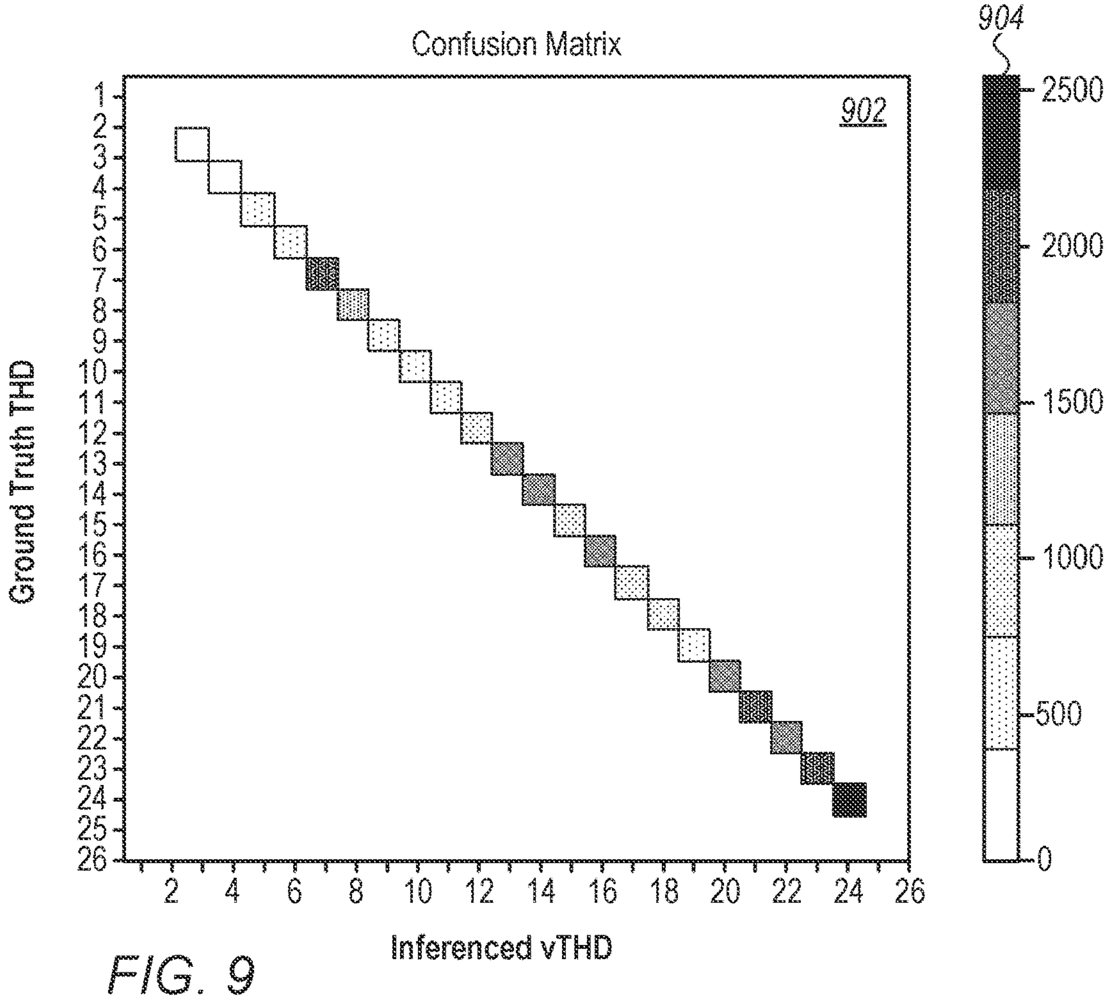
FIG. 9 illustrates a confusion matrix comparing vTHD estimated using the system of FIG. 6 with 1D CNN to a ground-truth THD of FIG. 7, in accordance with an embodiment of the present invention.

FIG. 9 illustrates a confusion matrix 902 comparing vTHD 610 estimated using system 601 of FIG. 6 to ground-truth THD of FIG. 7, in accordance with an embodiment of the present invention. The number of samples inferenced at each THD level is indicated by a scale 904, with number of samples ranging between several tens to more than 2000.

As seen, for all THD>4, the errors made during inference by the trained 1D-CNN model 607 are deviations by one class at most. The vast majority of audio samples were accurately classified by system 601. Whenever there is a lower precision, it turns, these categories have improved accuracy with additional training data. Therefore, adding more data will improve the results, as the low performances is due to insufficient amount of data in these categories and not a deficiency inherent in the 1D-CNN.

The shown example of FIG. 9 is brought by way of example. As another example, rather than use classification to estimate an error in vTHD compared to a ground truth THD, an RNN my use a regression-based scoring, as described above. The disclosed classification method is also applicable to LSTM, GRU, and CNN. More generally, output of any of the aforementioned ML models can be estimated with classification and/or regression.

Method of Directly Estimating of vTHD of a Short Audio Sample

Figure 10:
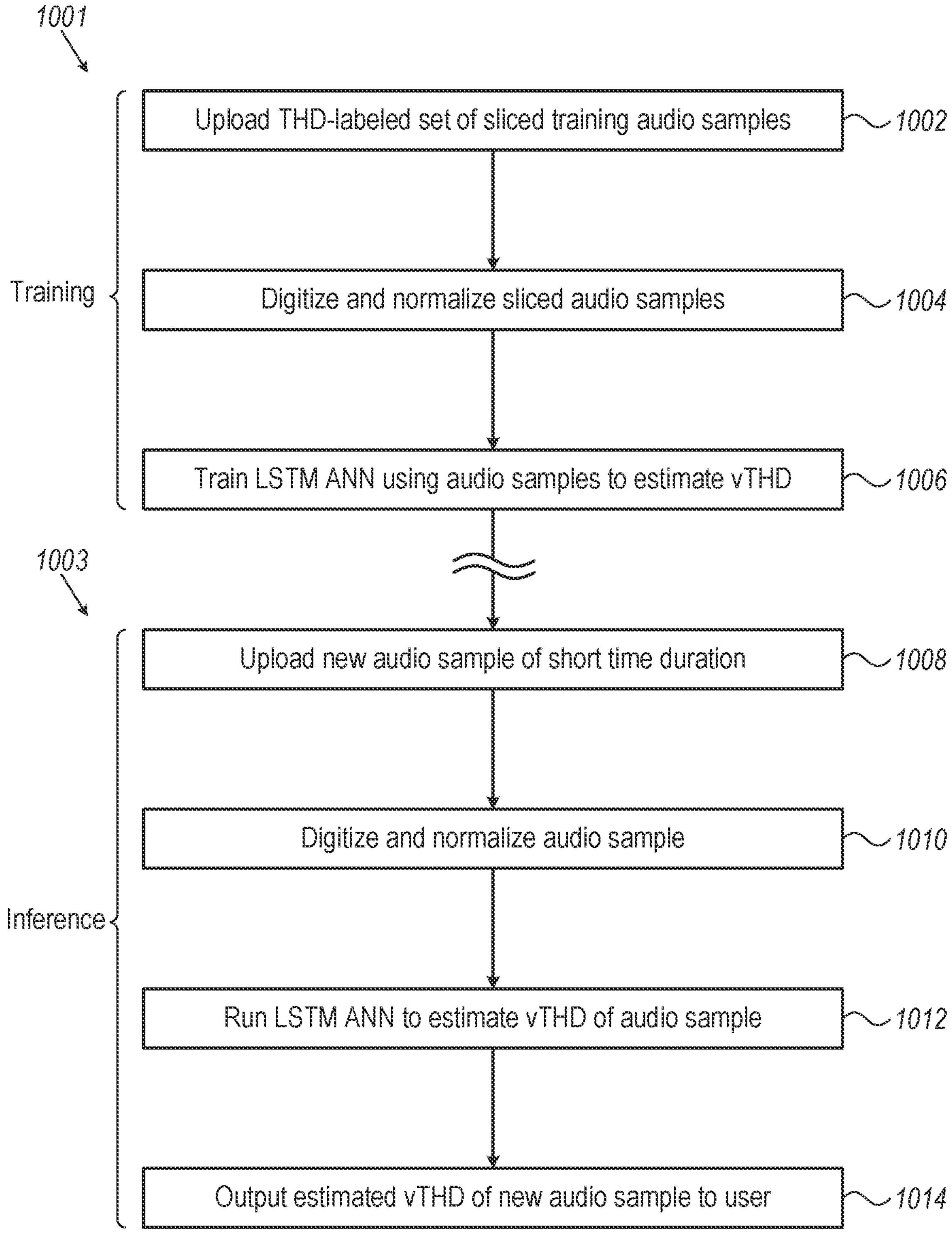
FIG. 10 is a flow chart that schematically illustrates a method for estimation of vTHD of a short audio sample using the system of FIG. 6, in accordance with an embodiment of the present invention.

FIG. 10 is a flow chart that schematically illustrates a method for estimation of vTHD of a short audio sample using the system 601 of FIG. 6, in accordance with an embodiment of the present invention. The algorithm, according to the presented embodiment, carries out a process that is split between a training phase 1001 and an inferencing phase 1003.

The training phase begins at an uploading step 1002, during which processor 208 uploads a set of short (e.g., sliced) training audio samples, like the 5-cycle audio sample used in FIG. 7, from memory 209. Next, processing circuitry 606 digitizes and normalizes the audio samples, at a data preprocessing step 1004.

In an LSTM ANN training step 1006, processor 208 trains LSTM ANN 609 using the audio samples to estimate a vTHD of an audio signal.

Inference phase 1003 begins by system 601 receiving as an input a short time duration audio sample (e.g., of several milliseconds duration), at an audio sample inputting step 1008.

Next, processing circuitry 606 digitizes and normalizes the short audio sample, at an audio sample preprocessing step 1010. Then, processor 208 runs the trained LSTM ANN 609 to estimate a vTHD value of the audio sample, at a vTHD estimation step 1012. Finally, at a vTHD outputting step 1014, processor 208 of system 601 outputs the estimated vTHD to a user, or to a processor, to, for example, adjust a nonlinear audio stage according to a desired vTHD value, such as to adjust a saturation level imposed by nonlinear audio processor 105 of audio processing apparatus 101.

The flow chart of FIG. 10 is brought purely by way of example, for the sake of clarity. For example, other ML models such as 1D CNN, may be used.

Although the embodiments described herein mainly address audio processing for audio engineering suits and/or consumer grade devices, the methods and systems described herein can also be used in other applications, such as audio quality analysis, filter design or auto-self-control of filters for still-images processing or for video processing, and, mutatis mutandis, encoding and decoding techniques for data compression that are based or partially based on FFT analysis.

The disclosed technique my be implemented in hardware in a form where parameters of the ML model are hard coded (e.g., as weights of an NN). In such case, a system may be provided that includes an interface and processing circuitry. The interface configured to receive an input audio signal. The processing circuitry is configured to estimate a level of the distortion in the input audio signal by applying the trained ML model to the input audio signal.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
a memory configured to store a machine learning (ML) model; and
a processor, which is configured to:
obtain a set of initial audio signals, which have first durations in a first range of durations and which are labeled with respective levels of distortion;
slice the initial audio signals to produce a plurality of training audio signals having second durations in a second range of durations, shorter than the first durations;
label each training signal with a same label as an initial audio signal from which the training signal was sliced;
train the ML model to estimate the levels of the distortion based on the training audio signals having the second, shorter durations;
receive an input audio signal having a duration in the second range of durations; and
estimate a level of the distortion in the input audio signal by applying the trained ML model to the input audio signal.

2. The system according to claim 1, wherein the processor is further configured to normalize the initial audio signals and normalize the input audio signal.

3. The system according to claim 1, wherein the distortion comprises a Total Harmonic Distortion (THD).

4. The system according to claim 1, wherein the ML model comprises a convolutional neural network (CNN).

5. The system according to claim 4, wherein the CNN classifies the distortion according to the levels of distortion that label the training audio signals.

6. The system according to claim 4, wherein the CNN estimates the distortion using a regression method.

7. The system according to claim 1, wherein the ML model comprises a recursive neural network (RNN).

8. The system according to claim 7, wherein the RNN comprises a long short term memory (LSTM) artificial neural network (ANN).

9. The system according to claim 8, wherein the LSTM ANN estimates the level of distortion using one of classification and regression.

10. The system according to claim 7, wherein the RNN comprises a Gater Recurrent Unit (GRU) ANN.

11. The system according to claim 7, wherein the comprises a Transformer ANN, and wherein the Transformer ANN estimates the level of distortion using one of classification and regression.

12. The system according to claim 1, wherein the input audio signal is received from nonlinear audio processing circuitry.

13. The system according to claim 1, wherein the processor is further configured to control, using the estimated level of the distortion, an audio system that produces the input audio signal.

14. A method, comprising:
storing a machine learning (ML) model in a memory;
obtaining a set of initial audio signals, which have first durations in a first range of durations and which are labeled with respective levels of distortion;
slicing the initial audio signals to produce a plurality of training audio signals having second durations in a second range of durations, shorter than the first durations;
labeling each training signal with a same label as an initial audio signal from which the training signal was sliced;
training the ML model to estimate the levels of the distortion based on the training audio signals having the second, shorter durations;
receiving an input audio signal having a duration in the second range of durations; and
estimating a level of the distortion in the input audio signal by applying the trained ML model to the input audio signal.

15. The method according to claim 14, and comprising normalizing the initial audio signals and the input audio signal.

16. The method according to claim 14, wherein the distortion comprises a Total Harmonic Distortion (THD).

17. The method according to claim 14, wherein the ML model comprises a convolutional neural network (CNN).

18. The method according to claim 17, wherein the CNN classifies the distortion according to the levels of distortion that label the training audio signals.

19. The method according to claim 17, wherein the CNN estimates the distortion using a regression method.

20. The method according to claim 14, wherein the ML model comprises a recursive neural network (RNN).

21. The method according to claim 20, wherein the RNN comprises a long short term memory (LSTM) artificial neural network (ANN).

22. The method according to claim 21, wherein the LSTM ANN estimates the level of distortion using one of classification and regression.

23. The method according to claim 20, wherein the RNN comprises a Gater Recurrent Unit (GRU) ANN.

24. The method according to claim 20, wherein the RNN comprises a Transformer ANN, and wherein the Transformer ANN estimates the level of distortion using one of classification and regression.

25. The method according to claim 14, wherein the input audio signal is received from nonlinear audio processing circuitry.

26. The method according to claim 14, and comprising controlling, using the estimated level of the distortion, an audio system that produces the input audio signal.

27. A system, comprising:
an interface; and
processing circuitry, which is configured to:
obtain a set of initial audio signals, which have first durations in a first range of durations and which are labeled with respective levels of distortion;
slice the initial audio signals to produce a plurality of training audio signals having second durations in a second range of durations, shorter than the first durations;
label each training signal with a same label as an initial audio signal from which the training signal was sliced;
train the ML model to estimate the levels of the distortion based on the training audio signals having the second, shorter durations;
receive, via the interface, an input audio signal having a duration in second range of durations; and
estimate a level of distortion in the input audio signal by applying a trained (ML) model to the input audio signal.

* * * * *